No. 710,205. Patented Sept. 30, 1902.
G. W. McDONALD.
CLOTHES LINE HOLDER.
(Application filed Nov. 16, 1901.)
(Model.)
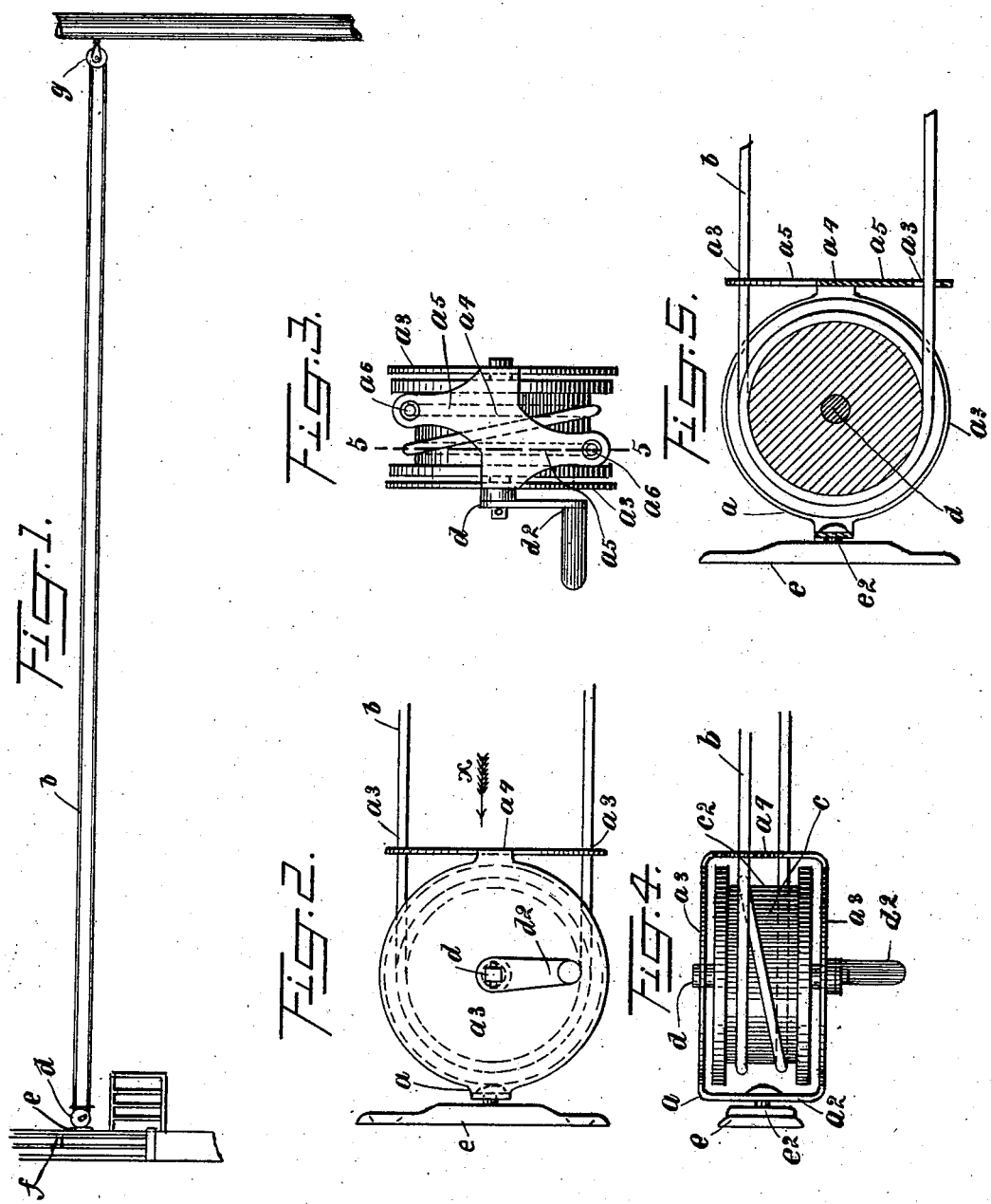
WITNESSES:
F. U. Stewart
F. F. Seller
INVENTOR
George W. McDonald
BY
Edgar Tate
ATTORNEYS

UNITED STATES PATENT OFFICE.

GEORGE W. McDONALD, OF JERSEY CITY, NEW JERSEY, ASSIGNOR OF ONE-HALF TO HENRY McDONALD, OF JERSEY CITY, NEW JERSEY.

CLOTHES-LINE HOLDER.

SPECIFICATION forming part of Letters Patent No. 710,205, dated September 30, 1902.

Application filed November 16, 1901. Serial No. 82,514. (Model.)

*To all whom it may concern:*

Be it known that I, GEORGE W. MCDONALD, a citizen of the United States, residing at Jersey City, in the county of Hudson and State of New Jersey, have invented certain new and useful Improvements in Clothes-Line Holders, of which the following is a full and complete specification, such as will enable those skilled in the art to which it appertains to make and use the same.

The object of this invention is to provide an improved clothes-line holder for the support of one end of a double line, the other end of which is supported by a pulley, so that the line may be turned on its supports or either part thereof moved in either direction, as may be desired, so as to facilitate the placing of the clothes thereon or their removal therefrom, and with this and other objects in view the invention consists in a device of the class specified constructed as hereinafter described and claimed.

In the drawings forming part of this specification, in which the separate parts of my improvement are designated by the same reference characters in each of the views, Figure 1 is a side view showing the application and use of my improved clothes-line holder; Fig. 2, a similar view of the holder proper; Fig. 3, a view at right angles to Fig. 2 looking in the direction of the arrow $x$; Fig. 4, a plan view of the holder, and Fig. 5 a section thereof on the line 5 5 of Fig. 3.

My improved clothes-line holder consists of a yoke-shaped bracket $a$, consisting of a cross-head $a^2$ and side plates $a^3$, which are connected opposite the cross-head $a^2$ by a transverse member $a^4$, provided with arms $a^5$, which project in opposite directions and one of which is adjacent to one of the side plates $a^3$ and the other adjacent to the other side plate $a^3$ and each of which is provided with a suitable opening or eye $a^6$, which form guides for the line $b$, which is passed twice around a spool $c$, mounted in the bracket $a$ and forming part of the holder, said spool being provided with a central shaft $d$ passing through the sides of said bracket and preferably provided at one end with a crank $d^2$. The spool $c$ is provided in the perimeter thereof with a groove $c^2$, in which the line $b$ is placed, and said groove may be of any desired form in cross-section, either angular, as shown, or segmental or of any preferred shape. The bracket $a$ is connected with a support $e$, preferably so as to turn thereon, as shown at $e^2$, and in practice this support $e$ is connected with the frame of a window, as shown at $f$ at the left of Fig. 1, and the other end of the line $b$ is connected with another pulley, $g$, suitably supported at any desired distance from the window. As thus constructed, the spool $c$ may be turned in its support either by means of the crank $d^2$ or by taking hold of one part of the line $b$, and the separate reaches of said line may be moved in either direction, as will be readily understood, and by reason of the guides $a^6$, through which the separate reaches of said line are passed, one of which is adjacent to one side of the spool and the other to the opposite side, the separate reaches of the line will always remain in proper relative position and the line will not overlap or be crossed on the spool $c$, and said spool is free to turn at all times, and by means of this device either part or reach of the line may be moved toward or from the window $f$ and clothes may be conveniently connected with the line or removed therefrom whenever desired, as will be readily understood.

Having thus fully described my invention, what I claim as new, and desire to secure by Letters Patent, is—

A device of the class described comprising a bracket or frame having parallel side members and adapted at one end to be connected with a suitable support and provided at the opposite end with a transverse member having guides near the opposite side of said frame which project in opposite directions, and a spool mounted in said frame and adapted to receive a line which is passed through said guides and around said spool, said guides being adapted to prevent the line from crossing in its movement around the spool, substantially as shown and described.

In testimony that I claim the foregoing as my invention I have signed my name, in presence of the subscribing witnesses, this 14th day of November, 1901.

GEORGE W. McDONALD.

Witnesses:
F. A. STEWART,
F. F. TELLER.